(12) United States Patent
Iizuka et al.

(10) Patent No.: US 11,906,656 B2
(45) Date of Patent: Feb. 20, 2024

(54) SENSOR

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP); Kazuki Numazaki, Iwate (JP); Nobuyuki Shiraki, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 17/414,690

(22) PCT Filed: Feb. 25, 2020

(86) PCT No.: PCT/JP2020/007381
§ 371 (c)(1),
(2) Date: Jun. 16, 2021

(87) PCT Pub. No.: WO2021/002049
PCT Pub. Date: Jan. 7, 2021

(65) Prior Publication Data
US 2022/0018936 A1    Jan. 20, 2022

(30) Foreign Application Priority Data
Jul. 2, 2019  (JP) .................................. 2019-123359

(51) Int. Cl.
*G01S 7/41*       (2006.01)
*G01S 13/46*    (2006.01)
*G01S 13/00*    (2006.01)

(52) U.S. Cl.
CPC ................ *G01S 7/41* (2013.01); *G01S 13/46* (2013.01)

(58) Field of Classification Search
None
See application file for complete search history.

(56) References Cited

U.S. PATENT DOCUMENTS

| 6,894,639 B1 * | 5/2005 | Katz | ........................ G01S 7/417 |
| | | | 706/15 |
| 10,371,808 B2 * | 8/2019 | Honma | .................... G01S 7/415 |
| (Continued) | | | |

FOREIGN PATENT DOCUMENTS

| JP | 5025170 B2 | 9/2012 |
| JP | 5047002 B2 | 10/2012 |
| (Continued) | | |

OTHER PUBLICATIONS

D. Sasakawa et al., "Fast estimation algorithm for living body radar," 2014 International Symposium on Antennas and Propagation Conference Proceedings, Kaohsiung, Taiwan, Republic of China, 2014, pp. 583-584, doi: 10.1109/ISANP.2014.7026785. (Year: 2014).*

(Continued)

*Primary Examiner* — Bernarr E Gregory
(74) *Attorney, Agent, or Firm* — Rimon, P.C.

(57) ABSTRACT

A sensor includes: a correlation matrix calculator which calculates a correlation matrix from biological information extracted using reception signals obtained by receiving, in a predetermined period, signals transmitted to a predetermined space; a first number information calculator which calculates first number information; a MUSIC spectrum calculator which estimates a candidate of a position of at least one living body and outputs a likelihood spectrum; and a second number information calculator which estimates a position or second number information, which is a total number of living bodies with an increased degree of likeli- (Continued)

hood, from first position information possibly including a plurality of position candidates.

9 Claims, 10 Drawing Sheets

(56) References Cited

U.S. PATENT DOCUMENTS

| | | | | |
|---|---|---|---|---|
| 10,663,573 | B2* | 5/2020 | Honma | G01S 13/42 |
| 11,047,968 | B2* | 6/2021 | Iizuka | G01S 13/42 |
| 11,175,380 | B2* | 11/2021 | Iizuka | G01S 13/42 |
| 11,226,408 | B2* | 1/2022 | Nakayama | G01S 7/415 |
| 11,255,955 | B2* | 2/2022 | Iizuka | G01S 13/003 |
| 11,515,949 | B2* | 11/2022 | Nakayama | G01S 13/878 |
| 11,561,279 | B2* | 1/2023 | Nakayama | G01S 7/415 |
| 2009/0102701 | A1* | 4/2009 | Mountcastle | G01S 7/415 |
| | | | | 342/180 |
| 2013/0169471 | A1* | 7/2013 | Lynch | G01S 3/46 |
| | | | | 342/107 |
| 2017/0184699 | A1* | 6/2017 | Honma | G01S 13/003 |
| 2017/0205502 | A1* | 7/2017 | Honma | G01S 13/46 |
| 2018/0192919 | A1* | 7/2018 | Nakayama | G01S 7/415 |
| 2018/0196131 | A1* | 7/2018 | Iizuka | G01S 13/003 |
| 2019/0195997 | A1* | 6/2019 | Iizuka | G01S 13/003 |
| 2019/0339379 | A1* | 11/2019 | Iizuka | G01S 13/003 |

FOREIGN PATENT DOCUMENTS

| | | |
|---|---|---|
| JP | 2014-228291 A | 12/2014 |
| JP | 2015-117972 A | 6/2015 |

OTHER PUBLICATIONS

International Search Report and Written Opinion dated Jun. 2, 2020 in International Patent Application No. PCT/JP2020/007381; with partial English translation.

Extended European Search Report dated Jul. 21, 2022 issued in the corresponding European Patent Application No. 20834853.2.

* cited by examiner

SENSOR

CROSS-REFERENCE OF RELATED APPLICATIONS

This application is the U.S. National Phase under 35 U.S.C. § 371 of International Patent Application No. PCT/JP2020/007381, filed on Feb. 25, 2020, which in turn claims the benefit of Japanese Application No. 2019-123359, filed on Jul. 2, 2019, the entire disclosures of which Applications are incorporated by reference herein.

TECHNICAL FIELD

The present disclosure relates to sensors, and particularly relates to a sensor that estimates the number of living bodies using radio signals.

BACKGROUND ART

Techniques for detecting a detection target using wirelessly transmitted signals have been developed (for example, refer to Patent Literature (PTL) 1).

PTL 1 discloses that the number, positions, etc., of persons to be detected can be identified by analyzing the eigenvalues of components including the Doppler shift using the Fourier transform on wirelessly received signals.

CITATION LIST

Patent Literature

[PTL 1] Japanese Unexamined Patent Application Publication No. 2015-117972
[PTL 2] Japanese Unexamined Patent Application Publication No. 2014-228291
[PTL 3] Japanese Patent No. 5047002
[PTL 4] Japanese Patent No. 5025170

SUMMARY OF INVENTION

Technical Problem

However, the problem with the technique disclosed in PTL 1 is that in a situation in which the Doppler effect is extremely weak such as the case where the detection target is a stationary living body, the distance over which detection is possible is short, and thus the number of persons, the position of a living body, and the like can only be estimated in a narrowed range.

The present disclosure is conceived in view of the above-described circumstances and has an object to provide a sensor capable of estimating the position of a living body, the number of persons, and the like in a widened range using radio signals.

Solution to Problem

In order to achieve the aforementioned object, a sensor according to one aspect of the present disclosure includes: a complex transfer function calculator which calculates a complex transfer function from reception signals obtained by receiving, by M reception antenna elements in a predetermined period, signals transmitted from a transmitter including N transmission antenna elements to a predetermined space, M being a natural number greater than or equal to 2, N being a natural number greater than or equal to 2; a biological component extractor which extracts biological information that is a component corresponding to a living body present in the predetermined space; a correlation matrix calculator which calculates a correlation matrix from the biological information extracted by the biological component extractor; a first number information calculator which calculates first number information that is a hypothesis of a total number of persons present in the predetermined space; a likelihood spectrum calculator which estimates a candidate of a position of the living body by a predetermined position estimation method using the correlation matrix, and outputs a likelihood spectrum indicating a likelihood of the living body being present at the position; and a second number information calculator which estimates second number information or a position by a predetermined method from first position information possibly including a plurality of position candidates, the second number information being a total number of living bodies with an increased degree of likelihood.

Advantageous Effects of Invention

With the sensor according to the present disclosure, it is possible to more accurately estimate the number of living bodies using radio signals.

DESCRIPTION OF EMBODIMENTS

Figure 1:
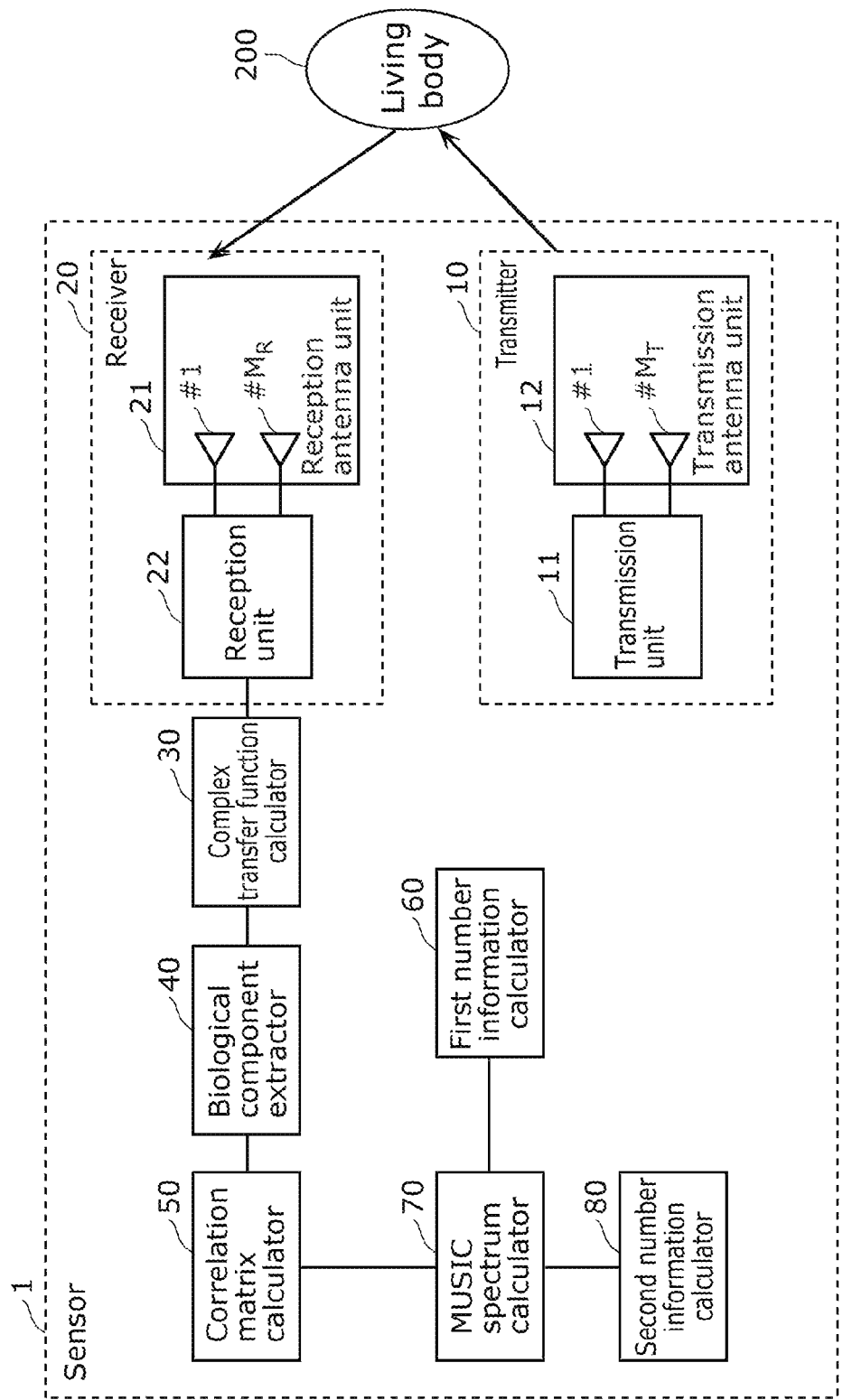
FIG. 1 is a block diagram illustrating the configuration of a sensor according to Embodiment 1.

Underlying Knowledge Forming Basis of the Present Disclosure

Techniques for detecting a detection target using wirelessly transmitted signals have been developed (for example, refer to PTL 1 to 4).

For example, PTL 1 discloses a technique for estimating the number, positions, etc., of persons to be detected, by analyzing the eigenvalues of components including the Doppler shift using the Fourier transform. Specifically, the Fourier transform is performed on received signals to obtain an autocorrelation matrix of a waveform from which a specific frequency component is extracted, an eigenvalue decomposition is performed on the autocorrelation matrix, and thus an eigenvalue is obtained. Generally, each of an eigenvalue and an eigenvector indicates a propagation path of electric waves from a transmission antenna to a reception antenna, namely, one path. However, in the technique disclosed in PTL 1, components including no biological information are eliminated, and therefore the eigenvalue and the eigenvector show only a path corresponding to a signal reflected by a living body and paths corresponding to noise and secondary reflection of the signal. Since the eigenvalue corresponding to noise is smaller than the eigenvalue corresponding to a living body, it is possible to estimate the number of living bodies by counting the number of eigenvalues greater than a predetermined threshold value.

However, with the technique disclosed in PTL 1, when a target living body is in the distance or when there are many living bodies, for example, the difference between the eigenvalue corresponding to the living body and the eigenvalue corresponding to noise is small, causing a problem of a decrease in the accuracy of estimating the number of persons. This is because, in a situation in which the Doppler effect is extremely weak, it is difficult to detect weak signals having a Doppler shift under the influences of inherent noise of a receiver, interference waves from objects other than the detection target, and an object that causes a Doppler shift other than the detection target, for example. Furthermore, a living body that becomes a measurement target is somewhat large in size, and components of the living body are distributed across more than one eigenvalue; therefore, when there are many living bodies, it is impossible to completely separate the eigenvalues of the living bodies, making it difficult to estimate the number of persons.

PTL 2 discloses a technique for estimating the position of a target using a direction estimation algorithm such as a multiple signal classification (MUSIC) method or the like. Specifically, a receiving station that has received signals transmitted by a transmitting station performs the Fourier transform on the received signals, obtains an autocorrelation matrix of a waveform from which a specific frequency component is extracted, and applies the direction estimation algorithm such as the MUSIC method or the like. This allows accurate direction estimation of a living body. However, since the MUSIC method used in PTL 2 previously requires the number of living bodies to be detected, it was found that the technique disclosed in PTL 2 requires estimation of the number of persons in advance.

Furthermore, for example, PTL 3 discloses a technique for estimating the number of incoming waves, in other words, the number of transmitters such as cellular phones, from the correlation between the eigenvectors of reception signals received by a plurality of antennas and a steering vector in a range in which electric waves can arrive.

Furthermore, for example, PTL 4 discloses a technique for assuming various numbers of incoming waves for reception signals received by a plurality of antennas, calculating an evaluation function using a steering vector for each of the various numbers of incoming waves, and estimating the number of incoming waves with the largest evaluation function as a true number of incoming waves.

The techniques disclosed in PTL 3 and 4 are, however, used to estimate the number of transmitters that emits electric waves, and were found incapable of estimating the number of living bodies.

Thus, in view of such analysis, the inventors arrived at the present disclosure by conceiving of a sensor, etc., capable of more accurately estimating a larger number of living bodies using radio signals without having a target living body hold a special device such as a transmitter.

Specifically, a sensor according to one aspect of the present disclosure includes: a complex transfer function calculator which calculates a complex transfer function from reception signals obtained by receiving, by M reception antenna elements in a predetermined period, signals transmitted from a transmitter including N transmission antenna elements to a predetermined space, M being a natural number greater than or equal to 2, N being a natural number greater than or equal to 2; a biological component extractor which extracts biological information that is a component corresponding to a living body possibly present in the predetermined space; a correlation matrix calculator which calculates a correlation matrix from the biological information extracted by the biological component extractor; a first number information calculator which calculates first number information that is a hypothesis of a total number of persons present in the predetermined space; a likelihood spectrum calculator which estimates a candidate of a position of the at least one living body by a predetermined position estimation method using the correlation matrix, and outputs a likelihood spectrum indicating a likelihood of the living body being present at the position; and a second number information calculator which estimates second number information or a position by a predetermined method from first position information possibly including a plurality of position candidates, the second number information being a total number of living bodies with an increased degree of likelihood.

With this configuration, even when an eigenvalue from which only noise is supposed to be separated is superimposed with a biological component, it is possible to improve the accuracy of estimating the number of persons by determining, from the shape of the likelihood spectrum, whether or not the peak of the spectrum is a true peak.

First, in the method using the eigenvalue, when the signal to noise ratio is small such as the case where a living body is in the distance, it is difficult to discern an eigenvalue corresponding to the living body and an eigenvalue corresponding to noise from each other using a threshold value. Furthermore, a living body that becomes a measurement target is somewhat large in size, and components of the living body are distributed across more than one eigenvalue; therefore, when there are many living bodies, it is impossible to completely separate the eigenvalues of the living bodies, making it difficult to estimate the number of persons.

Thus, in the present disclosure, the likelihood spectrum is calculated assuming the first number information which indicates the number of persons whose positions can be measured and is determined according to the number of antenna elements in the sensor and an environment in which the sensor is installed, for example. Therefore, there are cases where the number of persons actually present in a detection range and the first number information used to calculate the likelihood spectrum are different.

A representative example of the likelihood spectrum is a MUSIC spectrum which is used in the MUSIC method; hereinafter, the MUSIC spectrum will be described as a representative.

In the MUSIC method, when the first number information indicates a number less than the number of persons actually present, the number of peaks of the MUSIC spectrum is less than the number of persons actually present, meaning that somebody is left uncounted. When the first number information indicates a number greater than the number of persons actually present, the MUSIC spectrum includes a peak appearing at a position at which no living body is present, called a virtual image. The inventors found that the peak as the virtual image is characterized by, for example, being low in height and having a gradual slope. Therefore, the inventors found that it is possible to accurately estimate the number of persons by discerning the virtual image through determination using a threshold value for peak values of the MUSIC spectrum, determination using a ratio between the peak values, or determination using machine learning, to count the number of true peaks.

Furthermore, for example, the first number information calculator may output, as the first number information, a fixed value obtained by a predetermined method from a total number of the N transmission antenna elements and a total number of the M reception antenna elements.

With this configuration, it is possible to set the first number information appropriate for the number of antenna elements included in the sensor, thereby obtaining a likelihood spectrum having improved accuracy.

Note that the present disclosure can be implemented, not only as a device, but also as an integrated circuit including processing means included in such a device, a method having, as steps, the processing means included in said device, a program that causes a computer to execute said steps, and information, data, or signals indicating said program. Moreover, these program, information, data, and signals may be distributed via a recording medium such as a compact disc-read only memory (CD-ROM) or a communication network such as the Internet.

Hereinafter, embodiments of the present disclosure will be described in detail with reference to the drawings. Note that each of the embodiments described below shows a preferred, specific example of the present disclosure. The numerical values, shapes, materials, structural elements, the arrangement and connection of the structural elements, steps, the processing order of the steps, etc., shown in the following embodiments are mere examples, and therefore do not limit the present disclosure. Among the structural elements in the following embodiments, structural elements not recited in any one of the independent claims which indicate the broadest concepts of the present disclosure will be described as arbitrary structural elements of a preferred embodiment. In the specification and the drawings, structural elements having substantially the same functional configuration are assigned the same reference signs, and overlapping description will be omitted.

Embodiment 1

A method, etc., for estimating the number of persons by sensor 1 according to Embodiment 1 will be described below with reference to the drawings.

Configuration of Sensor 1

Figure 2:
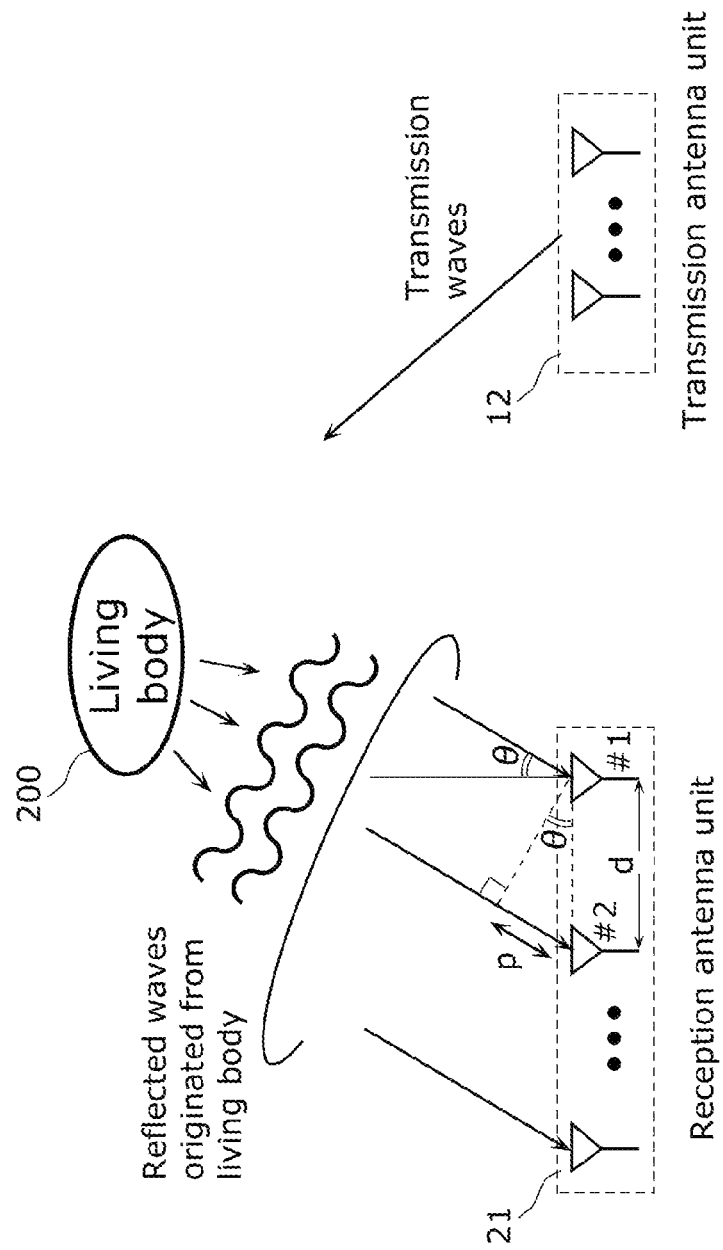
FIG. 2 is a conceptual diagram of a region in which a sensor according to Embodiment 1 is installed.

FIG. 1 is a block diagram illustrating the configuration of sensor 1 according to Embodiment 1. FIG. 2 is a conceptual diagram of a region in which sensor 1 according to Embodiment 1 is installed.

Sensor 1 illustrated in FIG. 1 includes transmitter 10, receiver 20, complex transfer function calculator 30, biological component extractor 40, correlation matrix calculator 50, first number information calculator 60, MUSIC spectrum calculator 70, and second number information calculator 80.

Transmitter 10

Transmitter 10 includes a transmission antenna. Specifically, transmitter 10 includes transmission unit 11 and transmission antenna unit 12, as illustrated in FIG. 1. Transmission antenna unit 12 includes an array antenna of $M_T$ elements. For example, the array antenna is a four-element patch array antenna in which the distance between array element antennas is a half wave long.

Transmission unit 11 generates high frequency signals to be used to estimate the presence or absence, the position, etc., of living body 200, and the number of persons. For example, transmission unit 11 generates 2.4 GHz continuous waves (CWs) and transmits the generated CWs from transmission antenna unit 12 as transmission waves. Note that the signals to be transmitted are not limited to the CWs and may be modulated signals.

Receiver 20

Receiver 20 includes reception antenna unit 21 and reception unit 22.

Reception antenna unit 21 includes an array antenna of $M_R$ elements. For example, the array antenna is a four-element patch array antenna in which the distance between array element antennas is a half wave long. Reception antenna unit 21 receives high frequency signals by the array antenna.

Reception unit 22 converts, using a down-converter, for example, the high frequency signals received by reception antenna unit 21 into low frequency signals on which signal processing can be performed. Furthermore, in the case where transmitter 10 transmits the modulated signals, reception unit 22 demodulates the modulated signals received. Reception unit 22 transfers, to complex transfer function calculator 30, the low frequency signals resulting from the conversion.

Note that the frequency used as an example in the present embodiment is 2.4 GHz, but frequencies at 5 GHz, in a millimeter-wave band, or the like may also be used.

Complex Transfer Function Calculator 30

Complex transfer function calculator 30 calculates, from signals observed by the array antenna of reception antenna unit 21, a complex transfer function indicating the propagation characteristics between the array antenna and transmission antenna unit 12 of transmitter 10. More specifically, complex transfer function calculator 30 calculates, from the low frequency signals transmitted from reception unit 22, a complex transfer function indicating the propagation characteristics between the $M_T$ transmission antenna elements of transmission antenna unit 12 and the $M_R$ reception antenna elements of the reception antenna unit. Note that there are case where the complex transfer function calculated by complex transfer function calculator 30 includes, for example, reflected waves or scattered waves that are signals obtained as a result of part of the transmission waves transmitted from transmission antenna unit 12 being reflected or scattered by living body 200. Furthermore, the complex transfer function calculated by complex transfer function calculator 30 includes reflected waves that have not traveled a route including living body 200 such as direct waves from transmission antenna unit 12 and reflected waves originated from a fixed object. Moreover, the amplitude and phase of the signals reflected or scattered by living body 200, in other words, the reflected and scattered waves obtained via living body 200, constantly vary due to biological activities such as breathing and heart rates of living body 200.

The following description assumes that the complex transfer function calculated by complex transfer function calculator 30 includes reflected waves and scattered waves that are signals reflected and scattered by living body 200.

Note that in the configuration diagram in FIG. 1, transmitter 10 and receiver 20 are illustrated adjacent to each other, but, in actuality, may be arranged apart from each other as illustrated in FIG. 2. Furthermore, the transmission antenna and the reception antenna may be the same. Moreover, these may be shared with hardware of radio electronics such as a Wi-Fi router and a slave unit.

Biological Component Extractor 40

Biological component extractor 40 extracts, from the signals observed by the reception array antenna of reception antenna unit 21, a biological component that is a signal component transmitted from transmission antenna unit 12 and reflected or scattered by at least one living body 200. More specifically, biological component extractor 40 records, in chronological order that is the order in which the signals are observed, the complex transfer function calculated by complex transfer function calculator 30. Subsequently, biological component extractor 40 extracts a varying component influenced by living body 200 among variations in the complex transfer function recorded in chronological order. Hereinafter, the varying component of the complex transfer function influenced by living body 200 will be referred to as a biological component. Here, examples of a method for extracting a biological component include a method in which only a biological component is extracted after conversion into frequency domains using a Fourier transform or the like and a method in which the difference between complex transfer functions at two different times is calculated to extract a biological component. With these methods, components of direct waves and reflected waves obtained via fixed objects are removed, and only biological components obtained via living body 200 remain. For example, using a 5-second complex transfer function, components from 0.3 Hz to 3 Hz are extracted, and breathing components which exist even while the living body stays still are extracted.

Note that in the present embodiment, the components from 0.3 Hz to 3 Hz are extracted as one example, but in the case where slower or faster movement needs to be extracted, needless to say, the frequency of components to be extracted may be changed accordingly.

Note that in the present embodiment, since the transmission array antenna includes $M_T$ transmission antenna elements and the reception array antenna includes $M_R$ reception antenna elements, in other words, there is more than one antenna element, the complex transfer function corresponding to the transmission and reception array antennas includes more than one biological component obtained via living body 200. Hereinafter, these will be collectively referred to as biological component channel matrix F(f) having M rows and N columns and are represented as in Expression 1 below.

[Math. 1]

$$F(f) = \begin{pmatrix} F_{11}(f) & \cdots & F_{1N}(f) \\ \vdots & \ddots & \vdots \\ F_{M1}(f) & \cdots & F_{MN}(f) \end{pmatrix} \quad \text{Expression 1}$$

Note that elements $F_{ij}$ of the biological component complex transfer function matrix, that is, biological component channel matrix F(f), is an element obtained by extracting varying components from elements $h_{ij}$ of the complex transfer function. Furthermore, the biological component complex transfer function matrix, that is, biological component channel matrix F(f), is a function of frequencies or similar differential periods and includes information corresponding to two or more frequencies.

Correlation Matrix Calculator 50

Correlation matrix calculator 50 converts a biological component channel matrix having M rows and N columns calculated by biological component extractor 40 into biological component channel vector $F_{vec}(f)$ having M×N rows and one column by rearranging elements of the biological component channel matrix. Examples of an arrangement method include a method such as that represented by Expression 2, but the order is not limited as long as the matrix is rearranged with such operation.

[Math. 2]

$$F_{vec}(f) = vec[F(f)] = \\ [F_{11}(f) \ldots F_{M1}(f)F_{12}(f) \ldots F_{M2}(f) \ldots F_{1N}(f) \ldots F_{MN}(f)]^T \quad \text{Expression 2}$$

Subsequently, correlation matrix calculator 50 calculates a correlation matrix from biological component channel vector $F_{vec}(f)$. More specifically, correlation matrix calculator 50 calculates, according to Expression 3, correlation matrix R of biological component channel vector $F_{vec}(f)$ including a plurality of varying components attributable to living body 200.

[Math. 3]

$$R = E[F_{vec}(f)F_{vec}(f)^H] \quad \text{Expression 3}$$

In Expression 3, E[ ] represents an average operation, and operator H represents complex conjugate transpose. Here, by averaging biological component channel vector $F_{vec}(f)$ including a plurality of frequency components in the frequency direction in correlation matrix calculation, sensing in which information included in the respective frequencies is simultaneously used becomes possible.

First Number Information Calculator 60

First number information calculator 60 calculates, according to a predetermined method, first number information to be used by MUSIC spectrum calculator 70. Here, the first number information is an integer greater than or equal to 1, but less than $M_R \times M_T$. Examples of a method to be used by first number information calculator 60 to calculate the first number information include the following methods. One example may be a method in which a fixed value obtained from the number of transmission antennas and reception antennas is used, and another example may be a method in which the average of the number of transmission antennas and the number of reception antennas is used. Furthermore, in the case where the maximum number of persons can be specified based on information of the location at which sensor 1 is installed, the value of the maximum number may be used as the first umber information. The first number information does not necessarily need to be a fixed value; for example, the number of persons estimated by sensor 1 in the past may be stored, and the value of said number plus one or two may be defined as the first number information.

In order to calculate a MUSIC spectrum, it is generally necessary that the number of incoming waves, that is, the number of persons in the present embodiment, have already been known, but, calculating the first number information by first number information calculator 60 as the temporary number makes it possible to calculate a MUSIC spectrum.

MUSIC Spectrum Calculator 70

Eigenvalue decomposition of the correlation matrix calculated by correlation matrix calculator 50 is as follows.

$$R = U \Lambda U^H \quad \text{[Math. 4]}$$

$$U = [u_1, \ldots, u_L, u_{L+1}, \ldots, u_{M_R}] \quad \text{[Math. 5]}$$

$$\lambda = \text{diag}[\lambda_1, \ldots, \lambda_L \lambda_{L+1}, \ldots, \lambda_{M_R}] \quad \text{[Math. 6]}$$

In this case, $$u_1, \ldots, u_{M_R} \quad \text{[Math. 7]}$$

is an eigenvector with $M_R$ elements, $$\lambda_1, \ldots, \lambda_{M_R} \quad \text{[Math. 8]}$$

is an eigenvalue corresponding to the eigenvector, and $$\lambda_1 \geq \lambda_2 \geq \ldots \geq \lambda_L \geq \lambda_{L+1} \geq \ldots \geq \lambda_{M_R} \quad \text{[Math. 9]}$$

is defined as the order of values. Here, L is the first number information calculated by first number information calculator 60.

Furthermore, the steering vector (direction vector) of the transmission array antenna is defined by

[Math. 10]

$$a_T \geq (\theta_T) = [1, e^{-jkd\sin\theta_T} \ldots, e^{-jkd(M_T-1)\sin\theta_T}]^T$$

and the steering vector (direction vector) of the reception array antenna is defined by

[Math. 11]

$$a_R \geq (\theta_R) = [1, e^{-jkd\sin\theta_R} \ldots, e^{-jkd(M_R-1)\sin\theta_R}]^T$$

where k is the number of waves. Furthermore, a steering vector obtained by multiplying these steering vectors and taking angle information of each of the transmission and reception array antennas into consideration is defined by

[Math. 12]

$$a(\theta_T, \theta_n) = vec[a_T(\theta_T) a_R^T(\theta_R)]$$

The MUSIC method is applied to this result.

In other words, MUSIC spectrum calculator 70 calculates a spectrum of evaluation function $P_{music}(\theta)$ indicated in Expression 4 below using the multiplied steering vectors according to the MUSIC method.

[Math. 13]

$$P_{music}(\theta) = \frac{1}{|a^H(\theta_1, \theta_R)[u_{L+1}, \ldots, u_{M_R}]|^2} \quad \text{Expression 4}$$

A spectrum based on the beamformer method, the Capon method, or the like may be used instead of the MUSIC spectrum; however, it needs to be noted that these methods have low accuracy compared to the MUSIC method, and accurate estimation is not possible with these methods alone.

Second Number Information Calculator 80

Second number information calculator 80 calculates, on the basis of the MUSIC spectrum calculated by MUSIC spectrum calculator 70, second number information indicating the number of living bodies present in a target region.

In the MUSIC spectrum calculated using input of the correct number of persons, there should appear a correct number of peaks for the persons. However, in the present embodiment, the MUSIC spectrum is calculated using the first number information indicating the number of persons greater than the correct number of persons, and therefore a virtual image is generated as a peak at which no living body is present in actuality. Thus, second number information calculator 80 discerns a peak among the peaks appearing in the MUSIC spectrum that is not a virtual image. Examples of the method for calculating the second number information include a method in which a ratio method is used for the peak values of a spectrum, a method in which the number of blocks including continuous regions with values greater than or equal to a predetermined threshold value in the MUSIC spectrum is counted, and a method in which the MUSIC spectrum is treated as an image and machine learning based on a convolutional neural network or the like is used. In the present embodiment, the method for calculating the second number information using the ratio method will be described as one example.

Figure 3:
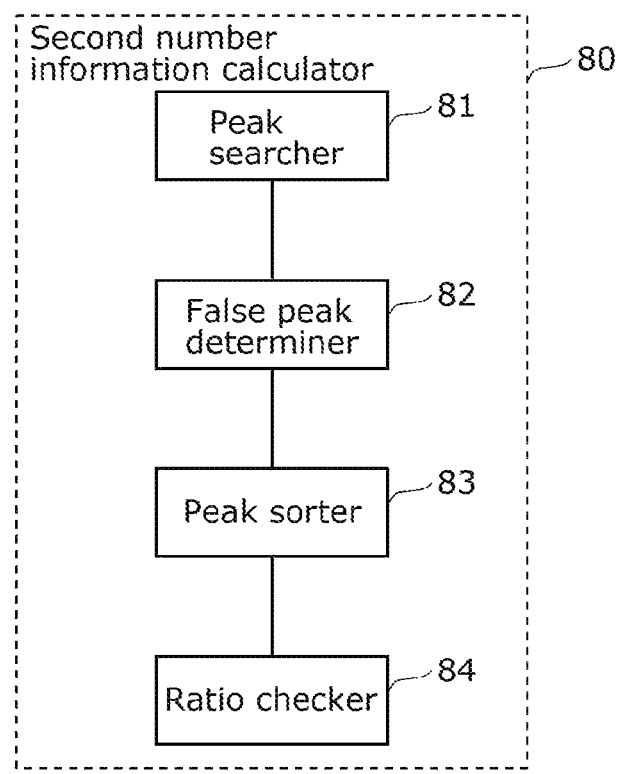
FIG. 3 is a block diagram illustrating the configuration of a second number information calculator using a ratio method.

FIG. 3 is a block diagram of second number information calculator 80 which calculates the second number information using the ratio method. Second number information calculator 80 includes peak searcher 81, false peak determiner 82, peak sorter 83, and ratio checker 84.

Peak Searcher 81

Peak searcher 81 searches for a peak having a local maximum value in the MUSIC spectrum. The set of peaks found at this time is referred to as a first peak set. Note that in order to remove small peaks formed due to noise, it is desired that only limited peaks having the largest values within a predetermined range x be included.

Figure 4:
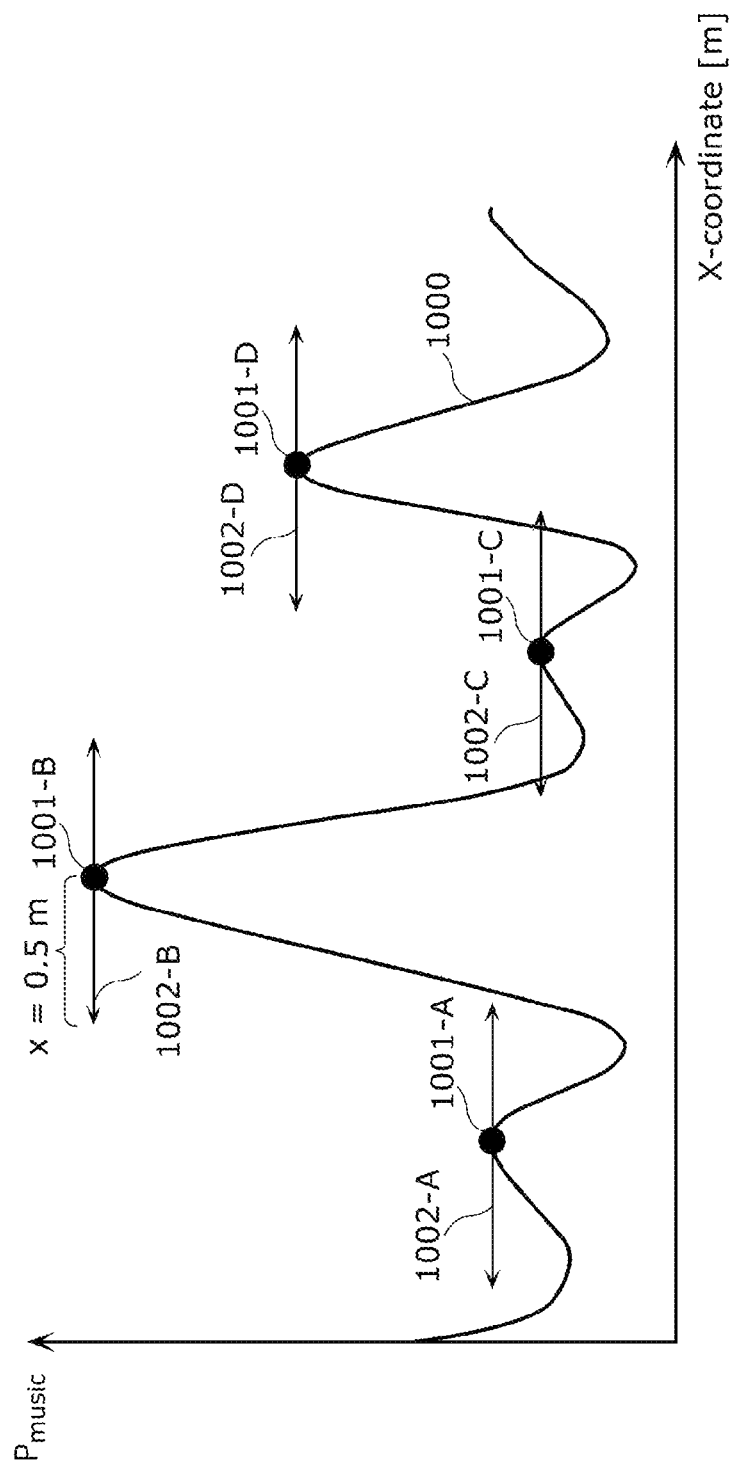
FIG. 4 is a conceptual diagram illustrating the operation of a peak searcher according to Embodiment 1.

FIG. 4 is a conceptual diagram illustrating the operation of peak searcher 81 according to Embodiment 1 and shows the process of peak searcher 81 using one-dimensional MUSIC spectrum 1000.

In FIG. 4, there are four peaks 1001-A, 1001-B, 1001-C, 1001-D. Peaks having the largest value within a distance of 0.5 m from the peaks indicated by 1002-A, 1002-B, 1002-C, 1002-D are three peaks 1001-A, 1001-B, 1001-D. Therefore, peak searcher 81 extracts three peaks 1001-A, 1001-B, 1001-D from MUSIC spectrum 1000, and creates the first peak set.

False Peak Determiner 82

False peak determiner 82 calculates a y % value of the values included in the predetermined x range around a peak value included in the first peak set, extracts a peak having a value whose difference or ratio with respect to the y % value is at least a predetermined threshold value z, and creates a second peak set. This makes it possible to exclude a gradual peak from the peaks included in the first peak set. For example, when the predetermined range covers a radius of 0.5 m, y is 70%, and z is 0.4 dB, only peaks greater, by at least 0.4 dB, than the 70% value of values included in the surrounding area having a radius of 0.5 m around each peak value included in the first peak set are extracted.

Peak Sorter 83

Peak sorter 83 sorts out the values of the peaks in the second peak set in descending order. Note that peak sorter 83 may add a value less by w than the smallest value of the peaks included in the second peak set to the second peak set as a virtual peak. For example, when w is set to 3.4 dB and the lowest peak is 3 dB minus the highest peak, the virtual peak to be added is 6.4 dB minus the highest peak.

Ratio Checker 84

Ratio checker 84 estimates the second number information by calculating a ratio between adjacent peak values in the second peak set sorted by peak sorter 83. More specifically, a ratio or a difference between the $i^{-th}$ peak and the $(i+1)^{-th}$ peak in the second peak set sorted in descending order is calculated, and value i with which the ratio or the difference is largest is output as the second number information. Here, i is an integer between 1 and the number of elements in the second peak set, inclusive.

Figure 5:
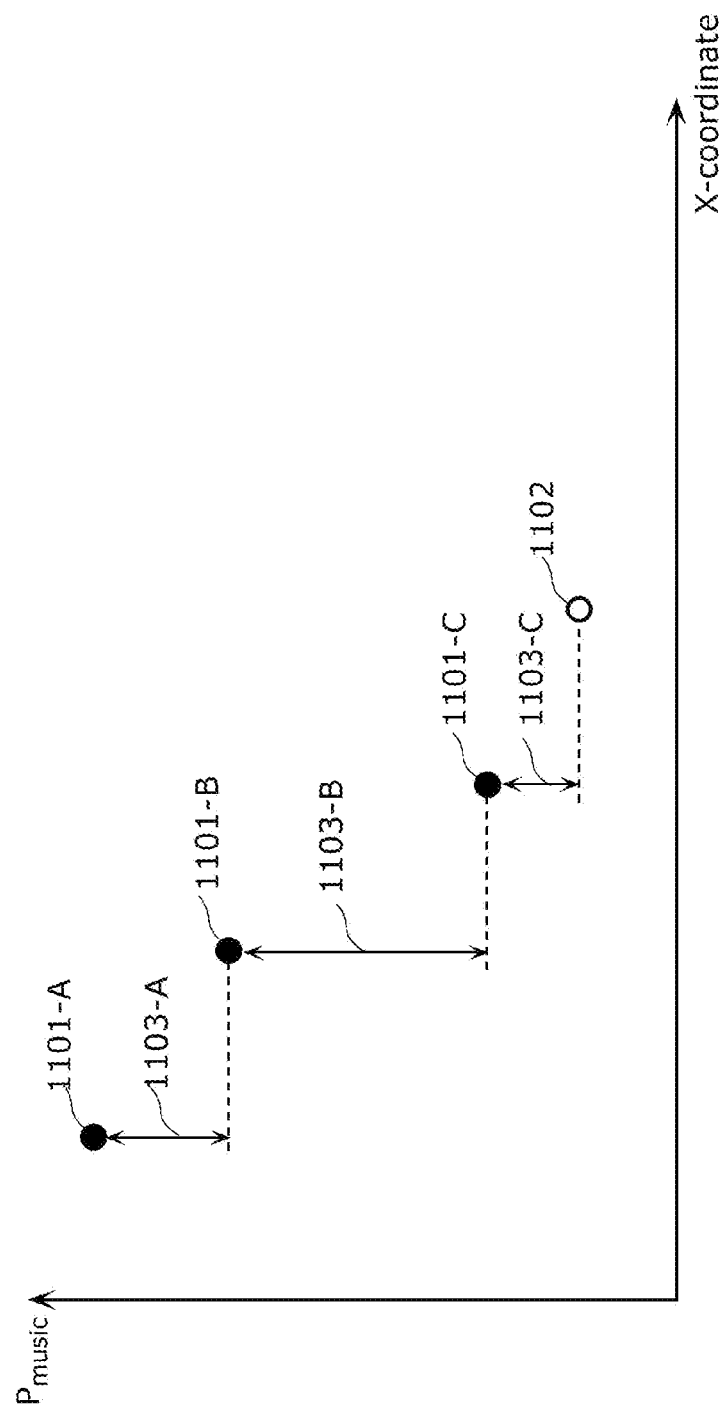
FIG. 5 is a conceptual diagram illustrating the operation of a ratio checker according to Embodiment 1.

FIG. 5 is a conceptual diagram illustrating the operation of ratio checker 84 according to Embodiment 1.

In FIG. 5, elements 1101-A, 1101-B, 1101-C, 1102 in the second peak set are sorted in descending order according to the peak values. Note that peak 1102 is a virtual peak added by peak sorter 83.

Peak sorter 83 calculates differences 1103-A, 1103-B, 1103-C between adjacent peaks in the second peak set and obtains a combination of peaks having the largest difference. In the example illustrated in FIG. 5, 1103-B is largest, meaning that the difference between the second peak 1101-B and the third peak 1101-C is largest; thus, the second number information calculated is 2.

Note that in the present embodiment, the second number information is output of the sensor because estimation of the number of persons is a purpose, but the position of a living body may be estimated using the MUSIC spectrum, and the output of the sensor may be position information of the living body.

Note that the present embodiment describes an example in which each of the transmission antenna and the reception antenna has a multiple-input multiple-output configuration (MIMO), but one of the transmission and reception antennas may have a single-antenna configuration. In this case, the MUSIC spectrum calculator outputs one-dimensional MUSIC spectrum, but even in this case, it is possible to estimate the second number information through peak search as in the case where the two-dimensional MUSIC spectrum is output.

Note that only for detection of the presence or absence, in other words, detection in the case where the number of persons is zero, the determination may be performed according to the largest eigenvalue, electric power of a varying component of the complex transfer function, and a correlation value with respect to that in the case where nobody is present, and MUSIC spectrum calculator 70 may calculate the MUSIC spectrum only when somebody is present. Thus, in the case where nobody is present, the computation required to calculate the MUSIC spectrum can be omitted.

Operation of Sensor 1

The following describes the process of estimating the number of living bodies by sensor 1 configured as described above.

Figure 6:
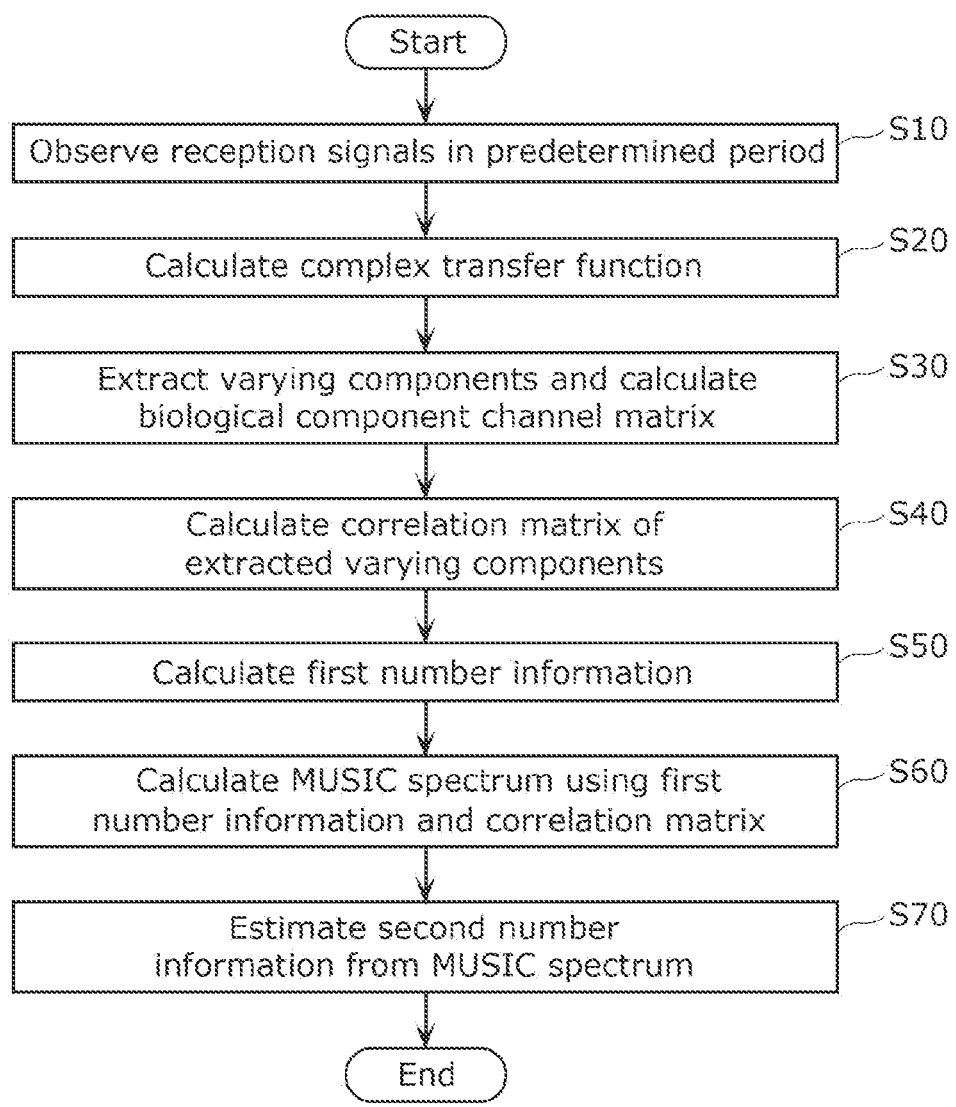
FIG. 6 is a flowchart illustrating the process of a sensor according to Embodiment 1.
Figure 7:
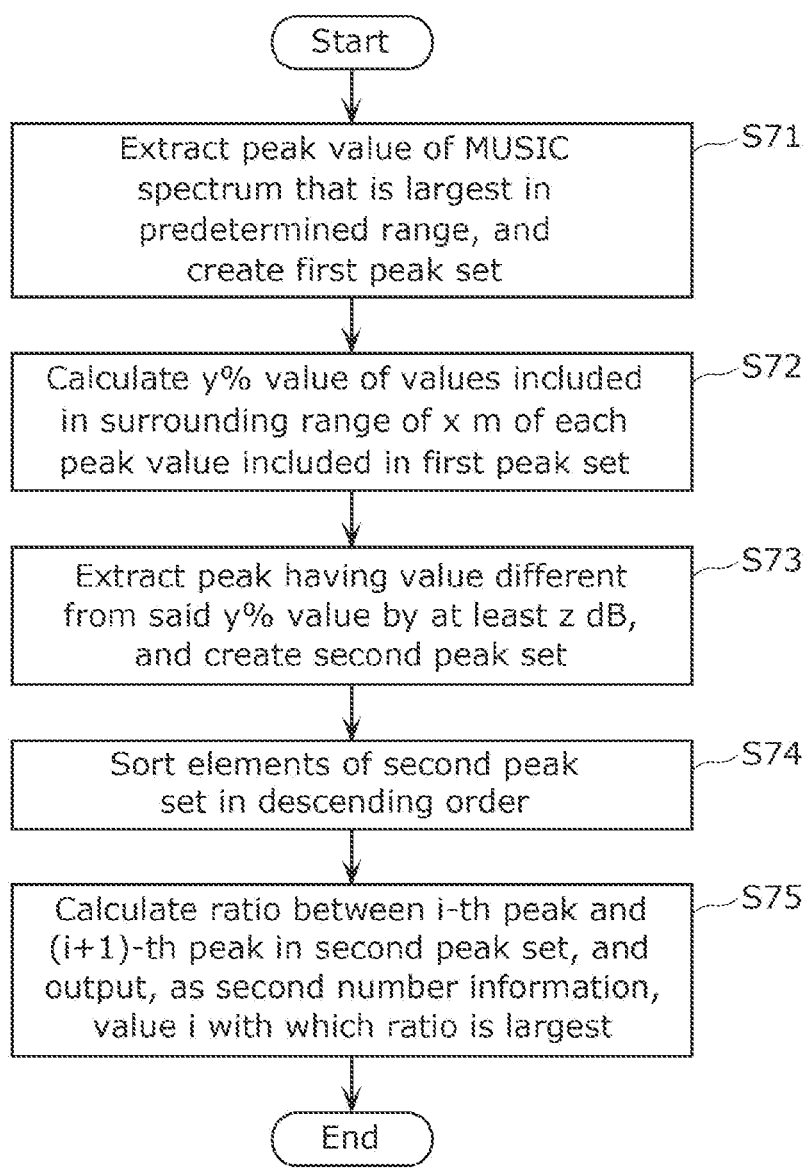
FIG. 7 is a flowchart illustrating a second number information calculation process of a sensor according to Embodiment 1.

FIG. 6 is a flowchart illustrating the process of sensor 1 according to Embodiment 1. FIG. 7 is a flowchart illustrating a second number information calculation process of the sensor according to Embodiment 1.

First, sensor 1 observes reception signals at receiver 20 in a predetermined period, as illustrated in FIG. 6 (S10).

Next, sensor 1 calculates a complex transfer function from the reception signals (S20).

Next, sensor 1 records the calculated complex transfer function in chronological order, extracts a varying component influenced by a living body from the complex transfer function recorded in chronological order, and thus calculates a biological component channel matrix (S30).

Next, sensor 1 calculates a correlation matrix of the calculated biological component channel matrix (S40).

Next, sensor 1 calculates the first number information using a predetermined method (S50). Here, the predetermined method may be a fixed value based on the number of transmission and reception antenna elements included in sensor 1 or may be a variation based on the result of past estimation of the number of persons.

Next, sensor 1 calculates a MUSIC spectrum on the basis of the first number information calculated in S50 and the correlation matrix calculated in S40 (S60).

Lastly, sensor 1 calculates the second number information from the MUSIC spectrum calculated in S60 and outputs the second number information as the number of living bodies (S70). The process in S70 is performed using, for example, a method in which the MUSIC spectrum is treated as an image and machine learning based on a convolutional neural network or the like is used, a method in which the number of blocks including continuous regions with values greater than or equal to a predetermined value in the MUSIC spectrum is counted, or a method in which a ratio method is used for the peak values of a spectrum.

With reference to the flowchart illustrated in FIG. 7, the process in S70 will be described below assuming that the method in which the ratio method is used is applied.

In S70, first, sensor 1 extracts a peak having the largest value in a predetermined range among the peaks of the MUSIC spectrum, and creates the first peak set, as illustrated in FIG. 7 (S71).

Next, sensor 1 calculates a y % value of the values included in a predetermined range around each peak included in the first peak set (S72).

Next, sensor 1 extracts a peak having a value different from the y % value by at least a predetermined threshold value, and creates the second peak set (S73).

Next, sensor 1 sorts, in descending order, the peak values included in the second peak set (S74).

Lastly, sensor 1 calculates a ratio or a difference between the $i^{-th}$ peak and the $(i+1)^{-th}$ peak in the second peak set, and outputs, as the second number information, value i with which the ratio or the difference is largest. Here, i is an integer between 1 and the number of elements in the second peak set, inclusive.

Advantageous Effects, Etc

With sensor 1 according to the present embodiment, the number of living bodies present can be accurately estimated using radio signals. Furthermore, with sensor 1 according to the present embodiment, even in the case where there are many living bodies and noise and biological components cannot be sufficiently separated through eigenvalue decomposition, it is possible to accurately estimate the positions of the living bodies. More specifically, an existing method for estimating the number of persons using an eigenvalue is on the premise that an eigenvalue corresponding to noise and an eigenvalue corresponding to a living body are clearly distinguishable, but, in actuality, small portions of biological components are superimposed on noise components, causing degradation in the accuracy of the existing method for estimating the number of living bodies. In the present disclosure, a spectrum can be calculated by the MUSIC method using the first number information that may indicate the number of persons greater than the actual number of persons, and only true peaks can be extracted from among the peaks of the spectrum according to characteristics of false peaks; thus, even in the case where an eigenvalue corresponding to noise and an eigenvalue corresponding to a living body cannot be sufficiently separated, it is possible to estimate the number of persons.

Variation of Embodiment 1

As a variation of Embodiment 1, complex transfer function calculator 30 may directly provide the calculated complex transfer function to second number information calculator 80, and second number information calculator 80 may calculate the second number information by a machining learning method such as the k-nearest neighbor method in which the complex transfer function is used as input.

This variation makes it possible to calculate the second number information without being impacted by a region in which the MUSIC spectrum is calculated.

Embodiment 2

Embodiment 1 describes a method for calculating the second number information by second number information calculator 80 using the ratio method. With reference to the block diagram in FIG. 8 and the conceptual diagram in FIG. 9, Embodiment 2 describes the case where second input information calculator 2080 counts the number of blocks including continuous regions with values greater than or equal to a predetermined threshold value in the MUSIC spectrum. Note that elements other than second input information calculator 2080 are the same as those in Embodiment 1, and therefore description thereof will be omitted.

Figure 8:
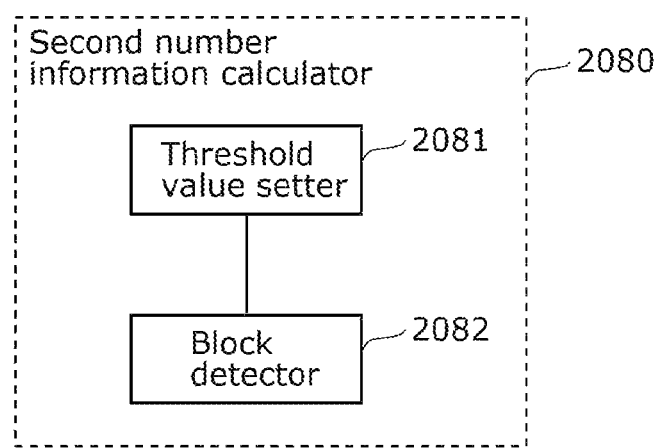
FIG. 8 is a block diagram illustrating the configuration of a second number information calculator according to Embodiment 2.
Figure 9:
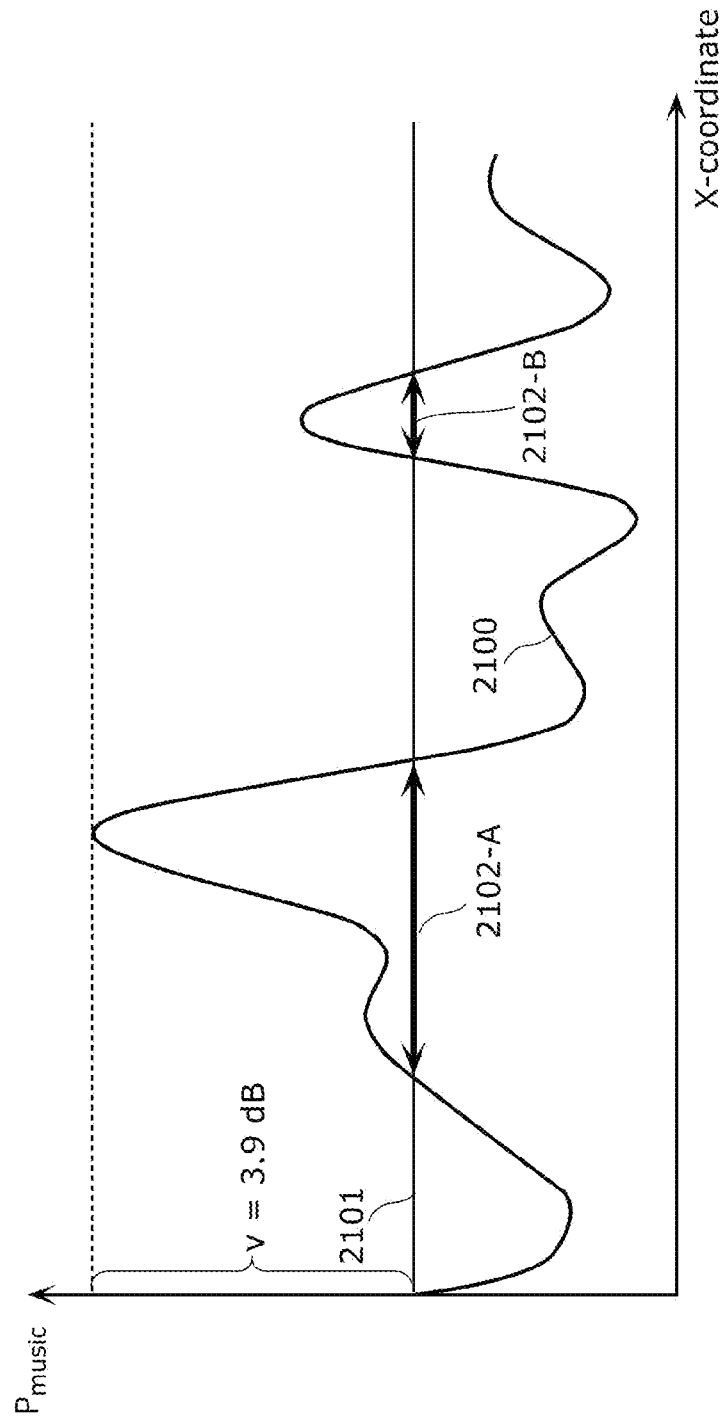
FIG. 9 is a conceptual diagram illustrating the operation of a block detector according to Embodiment 2.

FIG. 8 is a block diagram illustrating the configuration of second number information calculator 2080 according to Embodiment 2. FIG. 9 is a conceptual diagram illustrating the operation of block detector 2082 according to Embodiment 2.

second input information calculator 2080 includes threshold value setter 2081 and block detector 2082, as illustrated in FIG. 8.

Threshold value setter 2081 sets, for MUSIC spectrum 2100, threshold value 2101 which is less than the maximum value of the MUSIC spectrum by v dB. Note that preset fixed values may be used as v and threshold value 2101, or the accuracy of estimating the number of persons may be evaluated in advance using various values as v and threshold value 2101, and threshold value 2101 leading to the highest accuracy may be used as an optimal value. For example, in the case of sensing a 4-square-meter room with a four-element patch array antenna in which the distance between elements is a half wave long using unmodulated continuous waves at 2.47125 GHz, v is set to 3.9 dB.

Block detector 2082 detects a region in which MUSIC spectrum 2100 is greater than or equal to threshold value 2101 and counts the number of regions. In the example illustrated in FIG. 9, two regions 2102-A, 2102-B are blocks with values greater than or equal to threshold value 2101, and the second number information is calculated as 2.

Advantageous Effects, Etc

With the sensor according to Embodiment 2, the amount of calculation in the second number information calculator is smaller than in sensor 1 according to Embodiment 1; thus, the capability of a processing device required for real-time processing can be reduced, and the number of persons can be estimated at low cost.

Embodiment 3

Embodiment 1 describes a method for calculating the second number information by second number information calculator 80 using the ratio method. With reference to the block diagram in FIG. 10, Embodiment 3 describes the case where second input information calculator 3080 calculates the second number information using a convolutional neural network. Note that elements other than second input information calculator 3080 are the same as those in Embodiment 1, and therefore description thereof will be omitted.

Figure 10:
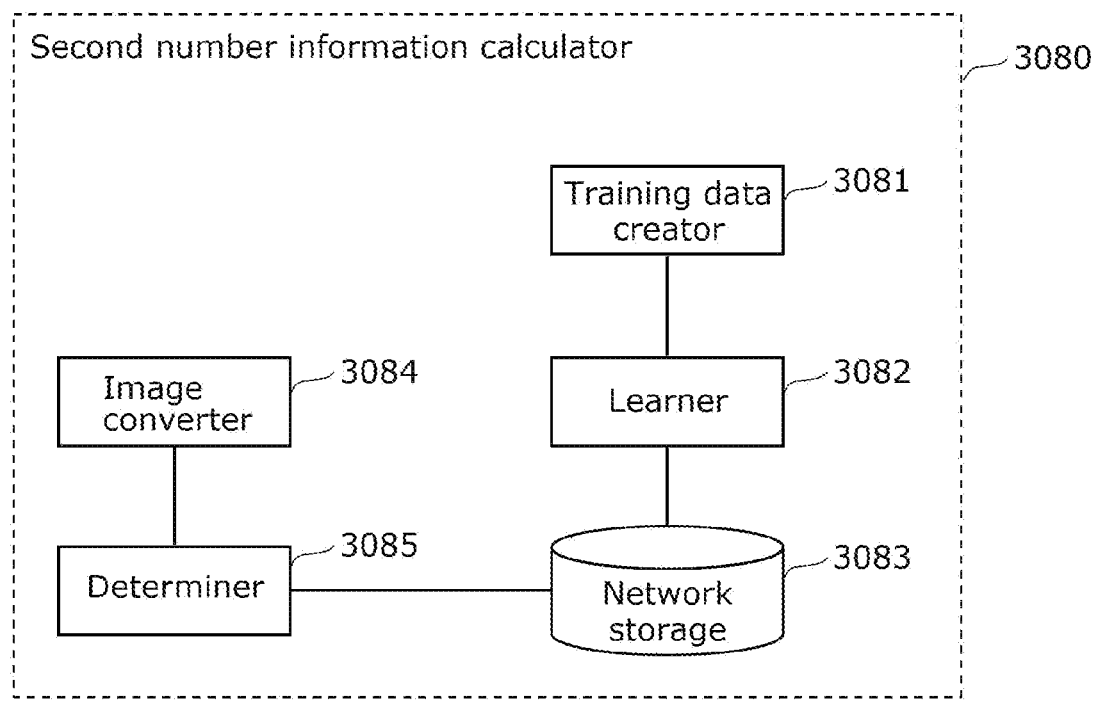
FIG. 10 is a block diagram illustrating the configuration of a second number information calculator according to Embodiment 3.

FIG. 10 is a block diagram illustrating the configuration of a second number information calculator according to Embodiment 3.

Second number information calculator 3080 includes training data creator 3081, learner 3082, network storage 3083, image converter 3084, and determiner 3085, as illustrated in FIG. 10.

Training data creator 3081, learner 3082, and network storage 3083 perform preliminary network learning, and image converter 3084 and determiner 3085 calculate the second number information on test data using a network learned in advance.

Training data creator 3081 obtains a plurality of MUSIC spectra in the case where the number of persons is already known in advance, and stores the plurality of MUSIC spectra as an image of training data. Here, more than one training data image is prepared for all the expected numbers of persons. For example, in the case where the upper limit of the number of persons present in a measurement region is three, more than one training data image is prepared for each of zero, one, two, and three persons; for example, 100 or more training data images are prepared.

Learner 3082 performs convolutional neural network learning using the training data images as input. Note that a method for improving the efficiency of neural network learning such as transfer learning, for example, may be used.

Network storage 3083 stores the convolutional neural network learned by learner 3082 into a memory on a computer, a recording medium such as a CD-ROM, or an external server via a network.

Image converter 3084 converts the MUSIC spectrum output by MUSIC spectrum calculator 70 into a format that can be processed in the convolutional neural network. For example, a heat map image having pixels corresponding to the values of the MUSIC spectrum can be processed in the convolutional neural network.

Determiner 3085 performs determination based on the convolutional neural network using the network stored in network storage 3083, and outputs output of the convolutional neural network as the second number information.

The sensor according to one aspect of the present disclosure has been thus far described based on the embodiments, but the present disclosure is not limited to the embodiments. Various modifications to the present embodiment that can be conceived by those skilled in the art, and forms configured by combining structural elements in different embodiments, without departing from the teachings of the present disclosure are included in the scope of the present disclosure.

The present disclosure can be implemented not only as a sensor including such characteristic structural elements, but also as an estimation method or the like including, as steps, the characteristic structural elements included in the sensor. Furthermore, the present disclosure can also be implemented as a computer program that causes a computer to execute the respective characteristic steps included in the method. In addition, it goes without saying that such a computer program can be distributed via a non-transitory computer-readable recording medium such as a CD-ROM and via a communication network such as the Internet.

Advantageous Effects, Etc

By applying the machine learning based on the convolutional neural network with the use of the sensor according to Embodiment 3, it is possible to automatically adjust various parameters such as the threshold value that need to be changed according to an environment in which the sensor is installed. In addition, further improvement in the accuracy of estimating the number of persons can also be expected by updating the learned network whenever necessary.

INDUSTRIAL APPLICABILITY

The present disclosure can be used, for example, in measuring instruments that measure the number, positions, etc., of living bodies, home appliances that perform control corresponding to the number, positions, etc., of living bodies, and monitoring devices that detect living body entry.

The invention claimed is:
1. A sensor for estimating a total number of living bodies, the sensor comprising:
a complex transfer function calculator which calculates a complex transfer function from reception signals obtained by receiving, by M reception antenna elements in a predetermined period, signals transmitted from a transmitter including N transmission antenna elements to a predetermined space, M being a natural number greater than or equal to 2, N being a natural number greater than or equal to 2;
a biological component extractor which extracts biological information that is a component corresponding to a living body possibly present in the predetermined space;
a correlation matrix calculator which calculates a correlation matrix from the biological information extracted by the biological component extractor;
a first number information calculator which calculates first number information that is a hypothesis of a total number of persons present in the predetermined space;
a likelihood spectrum calculator which estimates a candidate of a position of the living body by a predetermined position estimation method using the correlation matrix, and outputs a likelihood spectrum indicating a likelihood of the living body being present at the position; and
a second number information calculator which estimates second number information or a position by a predetermined method from first position information possibly including a plurality of position candidates, the second number information being a total number of living bodies with an increased degree of likelihood.

2. The sensor according to claim 1, wherein
the first number information calculator outputs, as the first number information, a fixed value obtained by a predetermined method from a total number of the N transmission antenna elements and a total number of the M reception antenna elements.

3. The sensor according to claim 1, wherein
the first number information calculator outputs the first number information based on a maximum number of persons to be accommodated in the predetermined space to which the transmitter transmits the signals.

4. The sensor according to claim 1, further comprising:
storage which stores number information estimated by the second number information calculator, wherein
the first number information calculator calculates the first number information by a predetermined method from past number information stored in the storage.

5. The sensor according to claim 1, wherein
the second number information calculator estimates the total number of living bodies by counting regions in which the likelihood spectrum continues to have a value greater than or equal to a predetermined value.

6. The sensor according to claim 1, wherein
the second number information calculator includes a determiner which uses machine learning resulting from previous learning with a likelihood spectrum that serves as training data, and
the second number information calculator outputs, as the total number of persons or the position, a determination result output from the determiner in response to input of the likelihood spectrum to the determiner.

7. The sensor according to claim 6, wherein
the second number information calculator uses a convolutional neural network.

8. The sensor according to claim 1, wherein
the second number information calculator includes:
a peak searcher which extracts a peak having a largest value in a predetermined range from among peaks of the likelihood spectrum, and creates a first peak set;
a false peak determiner which calculates a y % value of a value included in a predetermined range around each peak included in the first peak set, extracts a peak having a value different from the y % value by at least a predetermined threshold value, and creates a second peak set;

a peak sorter which sorts, in descending order, peak values included in the second peak set; and a ratio checker that calculates a ratio or a difference between an $i^{-th}$ peak and an $(i+1)^{-th}$ peak in the second peak set sorted in the descending order, and outputs, as the second number information, a value i with which the ratio or the difference is largest.

9. The sensor according to claim 1, wherein
the likelihood spectrum calculator is a multiple signal classification (MUSIC) spectrum calculator which uses a MUSIC method.

* * * * *